UNITED STATES PATENT OFFICE.

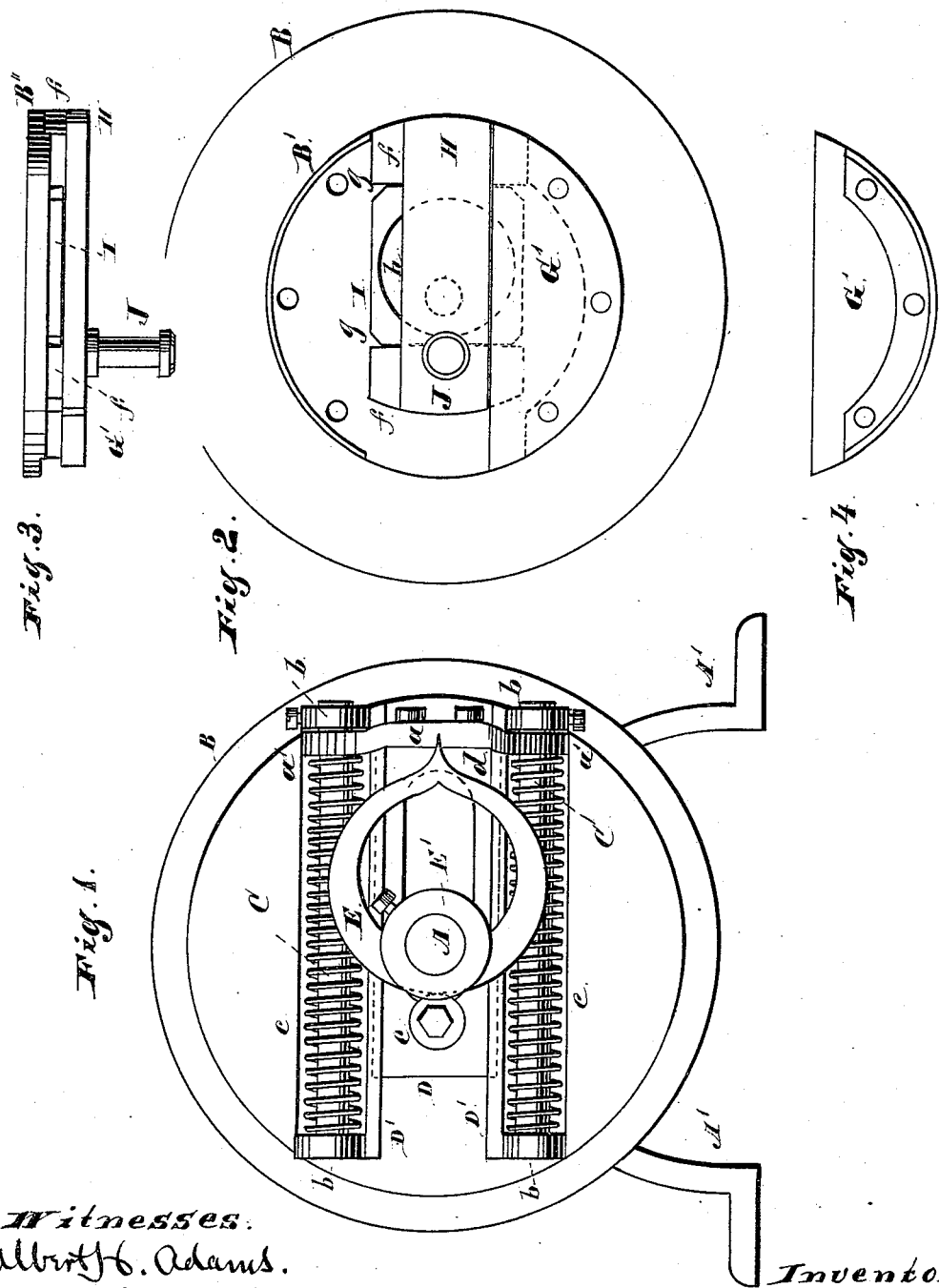

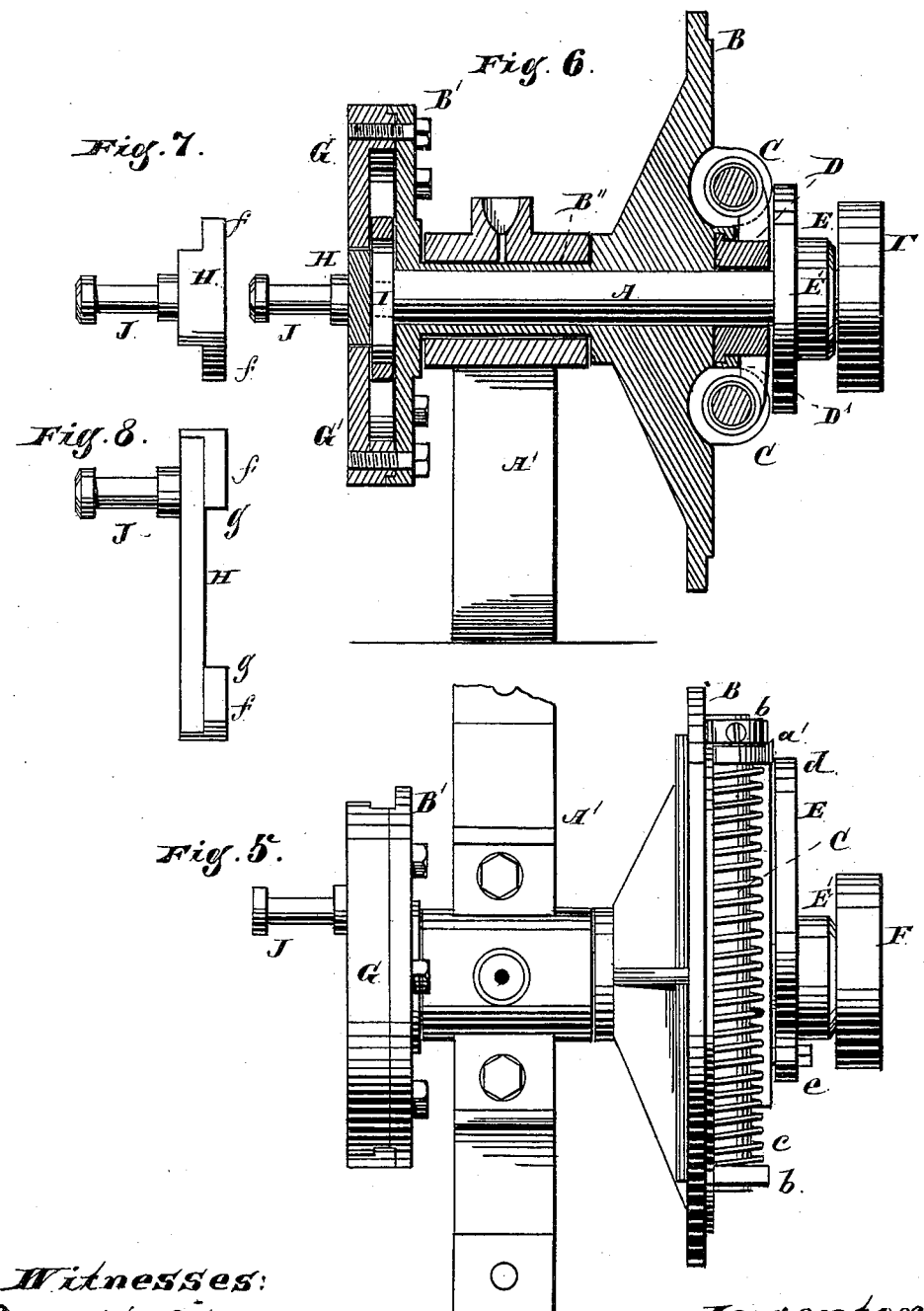

WILLIAM H. CLARK, OF CHICAGO, ILLINOIS.

SELF-ADJUSTING CRANK.

SPECIFICATION forming part of Letters Patent No. 253,265, dated February 7, 1882.

Application filed December 27, 1881. (No model.)

*To all whom it may concern:*

Be it known that I, WILLIAM H. CLARK, residing at Chicago, in the county of Cook and State of Illinois, and a citizen of the United States, have invented a new and useful Improvement in Self-Adjusting Cranks, of which the following is a full description, reference being had to the accompanying drawings, in which—

Figure 1 is an end elevation, showing the spring-disk; Fig. 2, an elevation from the opposite end, showing the crank-disk; Fig. 3, a plan or edge view of the crank-disk with one of the guide-plates removed; Fig. 4, an inside view of a guide-plate; Fig. 5, a plan view; Fig. 6, a longitudinal vertical section; Figs. 7 and 8, end and side views of the crank block or slide with pin.

The object of this invention is to improve the crank patented to me May 20, 1879, No. 215,435, so as to make the crank operate quicker in either direction, simplify its construction, and improve its operation.

The nature of the invention consists in constructing end disks or plates with an exterior or hollow shaft, so as to be rigid in reference to each other; in combining the disks or plates so connected with an interior shaft, having cams or eccentrics at each end, to operate in conjunction with the disk of the hollow shaft; in so combining the cams or eccentrics with slides that the crank-pin will be moved away from the center, as occasion may require, when power is applied to the crank-pin in either direction—that is, for advance or reverse movements; and, also, in the combinations of parts, as hereinafter set forth and claimed as new.

In the drawings, A indicates the main shaft; A', an ordinary bearing or bracket; B, the spring-disk; B', the crank-disk; B'', the hollow or cylindrical journal or shaft connecting the disks B and B'; C, the guide rods or bars; D, the spring-slide; E E', cam or eccentric for controlling the movements of the spring-slide D and the rotation of the interior shaft; F, the pulley or belt-wheel for transmitting power; G G', guide-plates on the crank-disk B'; H, crank block or slide; I, an annulus or nut surrounding the eccentric $h$; J, crank or wrist pin; $a$, cross-head on the spring-slide D, having guide-projections $a'$; $b$, supports on the spring-disk B for the guide-rods C; $c$, springs surrounding the rods C; $d$, stop-point or lock on the cam or eccentric E; $e$, roller working against the cam or eccentric E, and operating the spring-slide D; $f$, guide-projections on the crank slide or block H; $g$, shoulders against which the nut or annulus I is held; $h$, the eccentric on the shaft A, operating the crank-block through the nut I.

As this improved crank is to be used in connection with hoisting, traveling, hydraulic, or steam engines, it will readily be understood that its supporting parts will be constructed in accordance with the use to which it is to be applied, or the engine with which it is to be connected, which supports are to take the place of the support A' shown.

The shaft A passes through the spring-disk B, hollow shaft B'', and crank-disk B', and has attached to its ends the cam or eccentric E and $h$. The length of the interior shaft, A, and the hollow shaft B'' will also depend upon the use or kind of a machine to which the crank is to be adapted or applied, as it is evident that it may be short, as shown, or of a very considerable length.

The hollow shaft B'' has upon one end the disk or plate B and at the opposite end the disk or plate B', which parts may be integral or be made in separate parts firmly connected together.

The spring-disk B, as shown, is a complete circle, and has depressions upon its face to make room for the springs $c$; but it is evident, from an inspection of Fig. 1, that it may be made in the form of an oblong plate. I prefer the circular form shown, as it forms a hub for a balance-wheel. The depressions may be omitted, as the only purpose subserved is making the device a little more compact. This disk or plate is provided with depressions $b$, which support and hold the guide rods or bars C. Helical springs $c$ surround the rods C, and when extended fill the space between the support $b$ and the shoulders $a'$ of the cross-tree $a$.

The spring-slide D rests against the face of the disk B, and is held in place and supported by guides D'. It is provided with a roller or pin, $e$, which, by the action of the pins, is held against the cams or eccentrics E. At the opposite end of the slide a cross-tree, $a$, is attached, which cross-tree is provided with bearings $a'$, that are acted upon by the springs so as to keep the roller $e$ in contact with the cam or eccentric E. The cam or eccentric E is made in the form shown, and is attached to the shaft A by means of the collar $E'$ and a set-screw, or by other well-known means. The cam or eccentric E is provided with a stop or extension, $d$, which, by coming in contact with the roller $e$ as the shaft A is turned, forms a limit or stop to the action of the cam or eccentric E, and also prevents the cam or eccentric E from turning around.

The disk $B'$ is a plain flat disk, to which is attached, by suitable set-screws, two guide-plates, G G', which guide-plates hold the crank slide or block in position against the disk $B'$.

The crank-block H is provided with projections $f$ at the ends and opposite sides, which projections are best made in one piece with the block. These projections $f$ pass between the guide-plates and the disk $B'$, while the edges of the block are held and guided by the inner edges of the guides G G'. The projections $f$ also form, by their faces $g$, guides for the nut I, for it will be seen that in order to permit a movement of the eccentric $h$ the annulus or nut I must move. The nut I fits against the shoulders $g$, so as to prevent rattling or end movement of the block H, while it is free to move up and down or across the block H. The eccentric $h$ fits within this nut I, so as to prevent rattling or end movement of the block H, and it is connected to the shaft A, so that when arranged as shown in Fig. 2 a movement of the disk $B'$ in either direction will move the crank-pin J outward or from the center.

The crank-disk $B'$, with its guide-plates G G', is shown circular, and I prefer this form; but it is evident that it need not be circular, as a rectangular plate having a sufficient width to properly hold the guides G would answer.

The slot in the slide D, through which the shaft A passes, might be so adjusted as to act as a limit-stop for the movement of the cam or eccentric E; but the form shown is preferable for the reason that it is less liable to stick and less liable to be effected by wear.

In operation power is applied to the pin J by a pitman or piston rod connection, in the usual manner of connecting such parts with a crank, and the power, when imparted, is transmitted in the form shown by the pulley or belt-wheel F. When running idle the crank-pin will be in its inner position, as shown in Fig. 2. When performing service the power applied to the crank-pin will operate to move said pin outward from the center until sufficient crank-leverage is obtained to perform the required service. It will be understood that when the crank-pin is in the inner position the cam or eccentric E is in the position shown in Fig. 1. While the outward movement of the slide takes place the crank-pin also has the usual rotary movement, which rotary movement causes the disks $B'$ B to rotate around the shaft A until the crank-pin reaches its outward position, or an intermediate position sufficient to perform the required service. The rotation of the disk $B'$ around the shaft A, as said disk is firmly connected with the hollow shaft and the disk B, causes the disk B also to rotate, and the rotation of this disk causes the cam or eccentric E to press against the roller $e$ to press it away from the shaft A, which movement tends to compress the springs $c$, which compression continues until the power applied at the crank-pin equalizes the pressure on the spring, in which condition the shaft will continue to rotate without further movement of the disks in their relation to the interior shaft, A. Whenever the service to be performed materially decreases, the springs $c$, by reason of their pressing the roller $e$ against the cam or eccentric E, cause the cam or eccentric E to turn back, which turning back brings the crank-pin back toward the center, so that the length of the crank is always self-adjusted to the required service.

The construction of the cam or eccentric E and the location of the slide D and roller $e$ in relation thereto is such that the operation of the cam or eccentric E, and its effect upon the sliding block H and the crank-pin, is the same when the crank-pin is moved in either direction by the power, so that this self-adjusting crank can be applied to reversing steam or hydraulic engines and operate with equal effect when moved in either direction.

This self-adjusting crank, as shown, is applied to a single engine; but as double cranks operated by double engines are in frequent use for hoisting, traveling, and other engines, it will frequently be found useful to extend the interior and exterior shafts beyond the disk or plate B, so that a duplicate of the crank parts and plate $B'$ can be placed on the opposite end of the shaft, and thus form a double crank. In this condition the disk or plate B, with its attachments, will be required to be made of double strength, or to be duplicated, as may be found most convenient. By either mode a complete double self-adjusting driver or main crank can be constructed.

In many cases—such as obtaining hydraulic pressure, compressing air, &c.—it is desirable to have a gradually-diminishing stroke, as quantity can be taken when the pressure is light and diminished as the pressure increases. In order to produce this operation, all that is required is to apply the power to pulley or wheel F, or at the end of the shaft opposite to the crank, and to place the crank-pin J on the opposite side of the interior shaft from that shown in Fig. 2, which change can be made by simply changing the crank-pin, or by changing ends with the slide H; and when the pin is so changed and the power applied to the wheel F the operation of the springs and cam or eccentric E will operate to keep the crank-pin at its outward limit or full stroke, and, as the service required increases, the turning of the exterior shaft with its disks upon the interior shaft will bring the crank-pin toward the center, and thus shorten the crank-arm and increase its power without changing the motion or speed of the machine or of the motive power.

What I claim as my new, and desire to secure by Letters Patent, is—

1. The hollow shaft B″, having the disks or plates B B′, attached to its ends, in combination with the interior shaft, A, substantially as and for the purpose specified.

2. The combination of the disk or plate B with the springs c and slide D, substantially as described.

3. The combination of slide D, having the roller or pin e, with the cam or eccentric E, substantially as set forth.

4. The combination of the disk or plate B, springs c, and slide D, having the pin or roller e, with the cam or eccentric E and shaft A, substantially as specified.

5. The combination of the disk or plate B′ and its guide-plates with the crank-block H, having the projections f and shoulders g, substantially as described.

6. The combination of the crank slide or block H, having the shoulders g, with the nut I and the eccentric h, substantially as set forth.

7. The combination of the disk or plate B′, having the guides G G′, and hollow shaft B″, with the sliding or crank block H, having guide-projections and shoulders, the nut I, eccentric h, and shaft A, substantially as and for the purpose set forth.

8. The combination of the disks or plates B B′ and hollow shaft B″, connected together as described, and the springs c, with the shaft A, cams or eccentrics E h, slide D, and crank-block I, substantially as specified.

9. The combination of the double cam or eccentric E, having the stop d, with the pin or roller e, for operating the slide when the eccentric is turned in either direction, substantially as described.

WILLIAM H. CLARK.

Witnesses:
   ALBERT H. ADAMS,
   O. W. BOND.